United States Patent
Khawand et al.

(10) Patent No.: US 7,190,679 B2
(45) Date of Patent: Mar. 13, 2007

(54) METHOD AND APPARATUS FOR ARBITRATING TRANSMIT EVENTS IN A MULTIMODE COMMUNICATION DEVICE

(75) Inventors: Charbel Khawand, Miami, FL (US); Moshe Refaeli, Hod Hasharon (IL); Jean Khawand, Miami, FL (US)

(73) Assignee: Motorola, Inc., Schaumburg, IL (US)

(*) Notice: Subject to any disclaimer, the term of this patent is extended or adjusted under 35 U.S.C. 154(b) by 944 days.

(21) Appl. No.: 10/147,781

(22) Filed: May 16, 2002

(65) Prior Publication Data

US 2003/0214916 A1   Nov. 20, 2003

(51) Int. Cl.
H04B 7/005 (2006.01)

(52) U.S. Cl. ............ 370/278; 370/329; 370/348; 455/436; 455/453

(58) Field of Classification Search ........ 370/329–330, 370/346, 278, 348; 455/438, 453
See application file for complete search history.

(56) References Cited

U.S. PATENT DOCUMENTS

| | | | | |
|---|---|---|---|---|
| 6,574,489 B1 * | 6/2003 | Uriya | ........................ | 455/567 |
| 7,035,596 B2 * | 4/2006 | Sato | ............................ | 455/76 |
| 7,039,438 B2 * | 5/2006 | Khlat | ........................ | 455/552.1 |

FOREIGN PATENT DOCUMENTS

| WO | WO0024157 | 4/2000 |
|---|---|---|
| WO | WO0024208 | 4/2000 |
| WO | WO0028686 | 5/2000 |
| WO | WO0028694 | 5/2000 |
| WO | WO0028756 | 5/2000 |

* cited by examiner

*Primary Examiner*—Chi Pham
*Assistant Examiner*—Richard Chang
(74) *Attorney, Agent, or Firm*—Scott M. Garrett

(57) ABSTRACT

A multi-mode mobile communication device capable of communicating with more than one mobile communication system simultaneously has a timer (400) for arbitrating between transmit events of two communication systems. The mobile communication device assigns a priority to each of the two communication systems, and when a transmit event conflict arises, it is resolved in favor of the system having the higher priority. The timer includes a delta timer (426) for timing the duration of transmit events. If the mobile communication device is engaged in a transmit event in one system, and a transmit event arises in the second system, the mobile communication device checks the delta timer. If the timer is not zeroed, the mobile communication device then checks priority of the events, and transmits whichever event has priority.

4 Claims, 5 Drawing Sheets

METHOD AND APPARATUS FOR ARBITRATING TRANSMIT EVENTS IN A MULTIMODE COMMUNICATION DEVICE

TECHNICAL FIELD

This invention relates in general to a multi-mode mobile communication devices capable of interfacing with more than one type of mobile communication network. More particularly it relates to methods and processes for a mobile communication device to interface with more than one of the mobile communication networks in the present vicinity of the mobile communication device, and for arbitrating transmit events by the mobile communication device.

BACKGROUND OF THE INVENTION

Mobile communications have become widespread in metropolitan areas around the world, and also outside metropolitan areas in many countries. In industrialized countries there is access to mobile communications along all major roads and motorways. The rapid growth of mobile communications and the competition among service providers has meant that communication networks often operate at capacity. There are a number of mobile communication systems that have achieved success in the marketplace, including analog cellular, digital cellular, time divisioned and code divisioned systems, as are well known in the art. It is quite typical in metropolitan regions that several competing network operators will be providing access to their respective subscribers. However, in response to communication services sometimes not being available because the subscriber's service provider is at capacity in the region where the subscriber is presently located, some manufacturers have begun designing and manufacturing multi-mode mobile communication devices. These multi-mode mobile communication devices are capable of interfacing with more than one mobile communication network, often using more than one air interface. An air interface describes the frequency, modulation, encoding, encryption, control protocols, traffic protocols, and so on. Therefore a multi-mode communication device will allow a user to switch to a different mobile communication service provider's network if the user's preferred system is unavailable due to capacity or other reasons.

However, while implementing multiple receiver paths in the mobile communication device has a only a relatively small effect on the cost to manufacture a mobile communication device, adding an additional transmit path capable of transmitting at the necessary power needed for mobile communication is much more expensive. Therefore it is desirable to have only a single transmitter in a multi-mode mobile communication device. This leads to problems when the mobile communication device is engaged with more than one communication system and the mobile communication device would ordinarily be required to transmit simultaneously to both systems at some time. Therefore a transmit event arbitration scheme is necessary to avoid having to implement multiple transmitters in a multi-mode mobile communication device. However, while it would be possible to perform such arbitration under software control, experience has shown that to do so, with complex protocols, can itself require complex and extensive coding. It would be more preferable to perform arbitration by relying on hardware more than software.

DETAILED DESCRIPTION OF A PREFERRED EMBODIMENT

Figure 1:
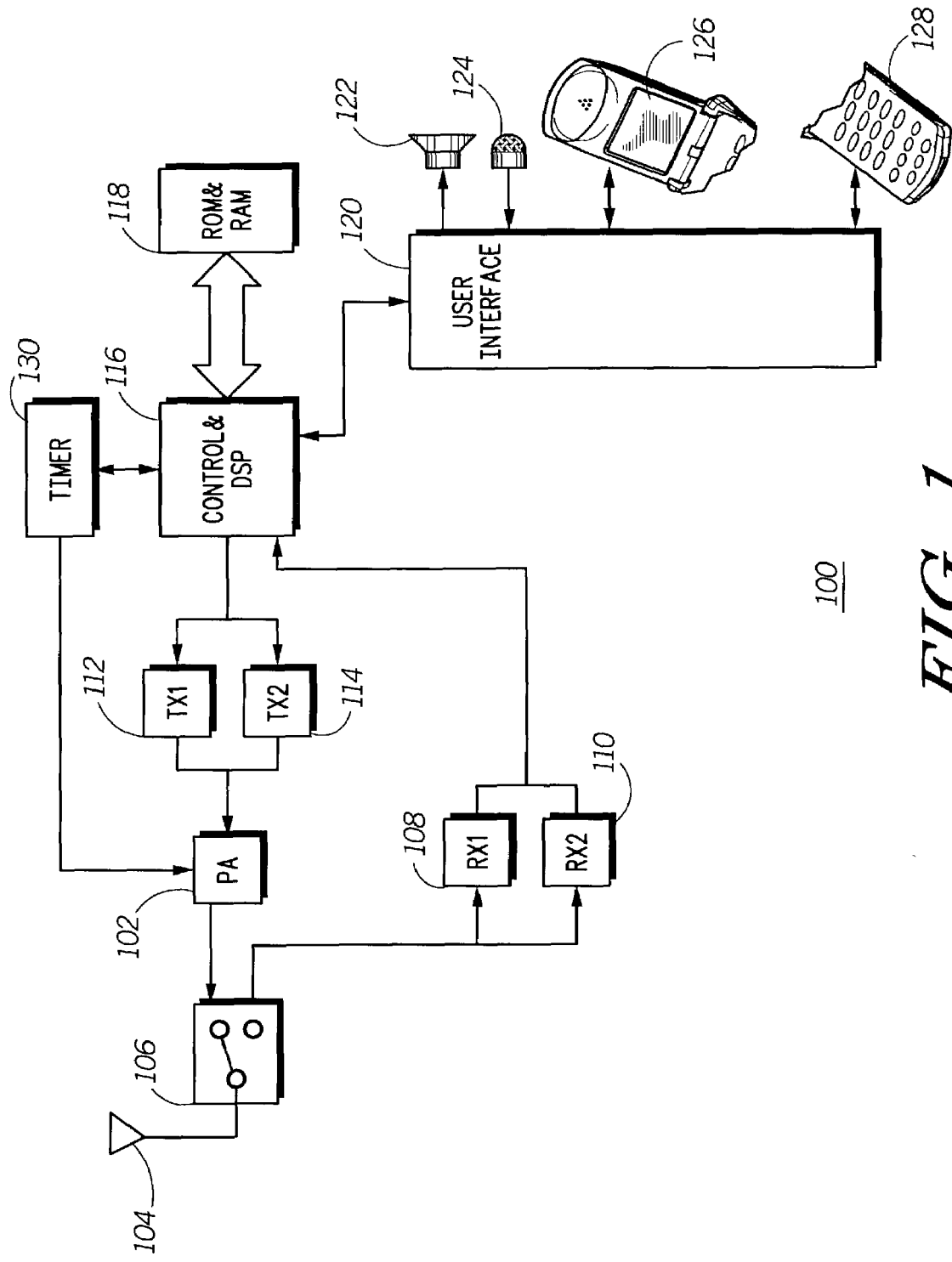
FIG. 1 shows a block schematic diagram of a multi-mode mobile communication device having a single power amplifier which arbitrates transmit events in accordance with the invention.

While the specification concludes with claims defining the features of the invention that are regarded as novel, it is believed that the invention will be better understood from a consideration of the following description in conjunction with the drawing figures, in which like reference numerals are carried forward.

The invention solves the problem of transmit arbitration in a multi-mode mobile communication device having only a single power amplifier with a new hardware timer mechanism that checks for conflicts in transmit events, and determines priority of such events. The timer checks the event opcode for each event to be executed, and when a transmit opcode is encountered, logic circuits in the timer device check for conflicts with other presently instantiated communication modes using the timer mechanism. When a conflict is found, the timer logic compares priority of the transmit events, and transmits or continues to transmit the event with the higher priority.

Referring now to FIG. 1, there is shown therein a block schematic diagram of a multi-mode mobile communication device 100, having a single power amplifier 102, which arbitrates transmit events in accordance with the invention. The mobile communication device has an antenna 104 for transmitting and receiving radio frequency electromagnetic waves, as is known in the art. The antenna is couple to an antenna switch 106 which is operated to alternatively couple the antenna to either the power amplifier or a receiver (108, 110). Being a multi-mode mobile communication device, there may be several receivers, such as a first receiver 108 and a second receiver 110. The receivers demodulate the received radio frequency signal, and provide a digital output. Even though there is only a single power amplifier, there may be multiple transmitter modules that perform the radio frequency modulation for each of the modes of communication. So, there may be a first transmitter 112 and a second transmitter 114. Both the receivers and transmitters are coupled to a control and digital signal processor (DSP) 116. The DSP receives the digital signals from the receivers, and provides digital signals to the transmitters for appropriate modulation, and subsequent transmission. The controller executes software code stored in a permanent memory, semi-permanent memory, or both, memory. The controller also uses RAM memory. The memory is shown as a lumped memory entity 118, and is accessed over a bus, as is known in the art. In general the controller executes several layers of software, including application code and operating system code. In the application layer the controller will instantiate applications for performing the tasks and decision making needed to engage in the difference communication modes. The controller also operates an ergonomic layer for use with a user interface 120 which operates input and output devices, such as a speaker 122, a microphone 124, a display 126, and a keypad or tactile input 128. Finally, the multi-mode mobile communication device comprises a timer 130. The timer interacts with the controller/DSP 116, and performs timing functions which allows the controller/DSP to execute processes at appropriate times. The timer is also coupled to the power amplifier 102. When the timer determines the time to transmit has arrived, the timer enables the power amplifier. When there is no transmit event occurring or presently ongoing, the power amplifier is not enabled to save battery power. The timer determines when transmit events occur, if there is a conflict between the modes of communication, and which mode of communication has priority.

Figure 2:
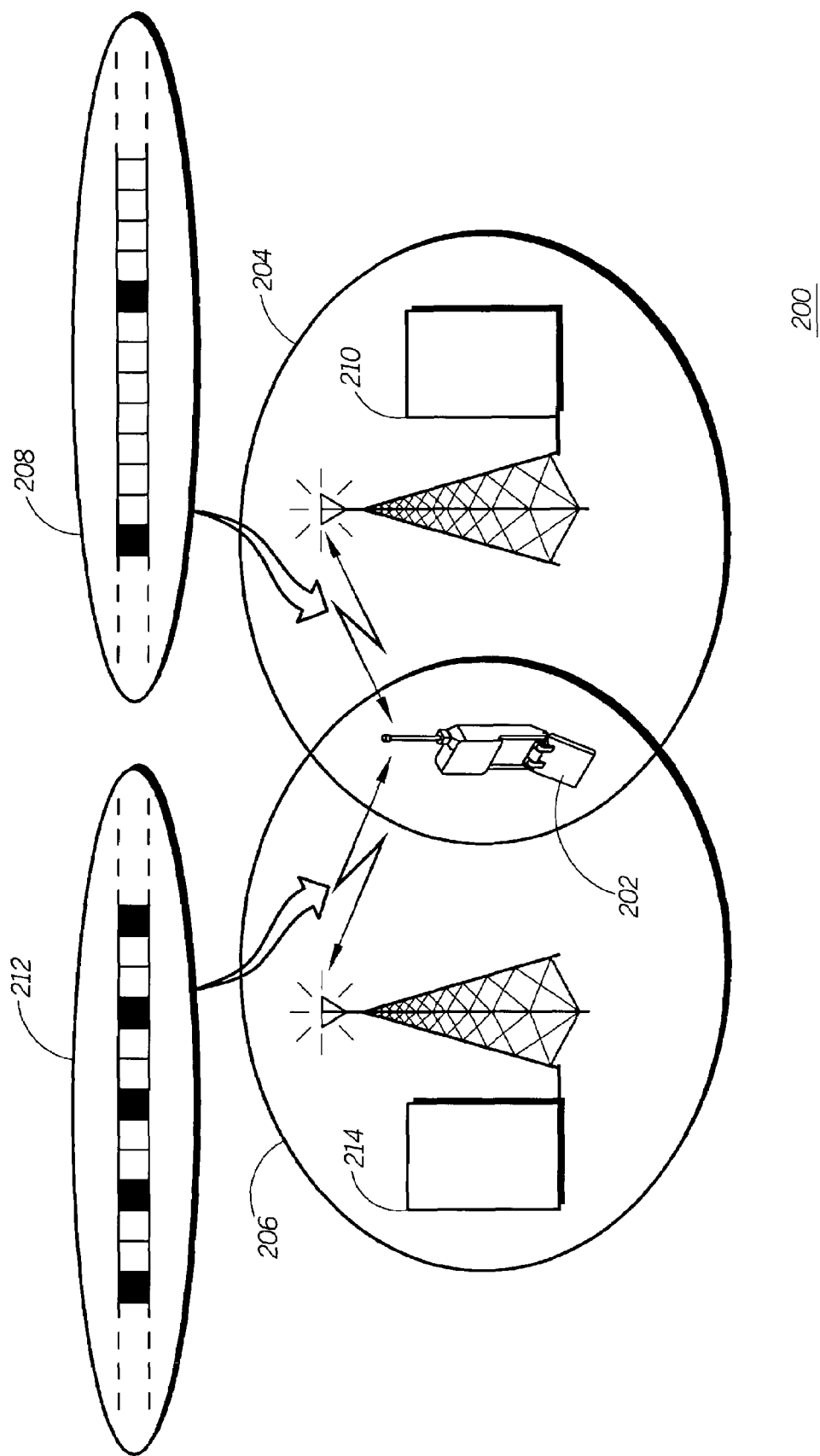
FIG. 2 shows a schematic diagram of a multi-mode mobile communication device operating in the service areas of two different mobile communication systems.

Referring now to FIG. 2, there is show a schematic diagram 200 of a multi-mode mobile communication device 202 operating in the service areas of two different mobile communication systems. The multi-mode mobile communication device is in the serving area 204 of a first communication system, and in a serving area 206 of a second communication system. The multi-mode mobile communication device communicates with the first communication system via an air interface 208 established in the vicinity of a base station 210. Likewise, the multi-mode mobile communication device communicates the second communication system via a different air interface 212 in the vicinity of another base station 214. The multi-mode communication device, for this example, is registered for service with each of the two communication systems. It should be noted that these are mobile communication systems, meaning the mobile communication device can move from cell to cell and have service handed over to each new cell it enters from the cell it leaves, as is known in the art. As shown, the first and second communication systems use a time division multiple access (TDMA) air interface, although it is contemplated that other types of communication interfaces may be used. The communication systems may use different time schemes, and different frame and time slot durations, giving rise to the potential for transmit event conflicts within the mobile communication device.

Figure 3:
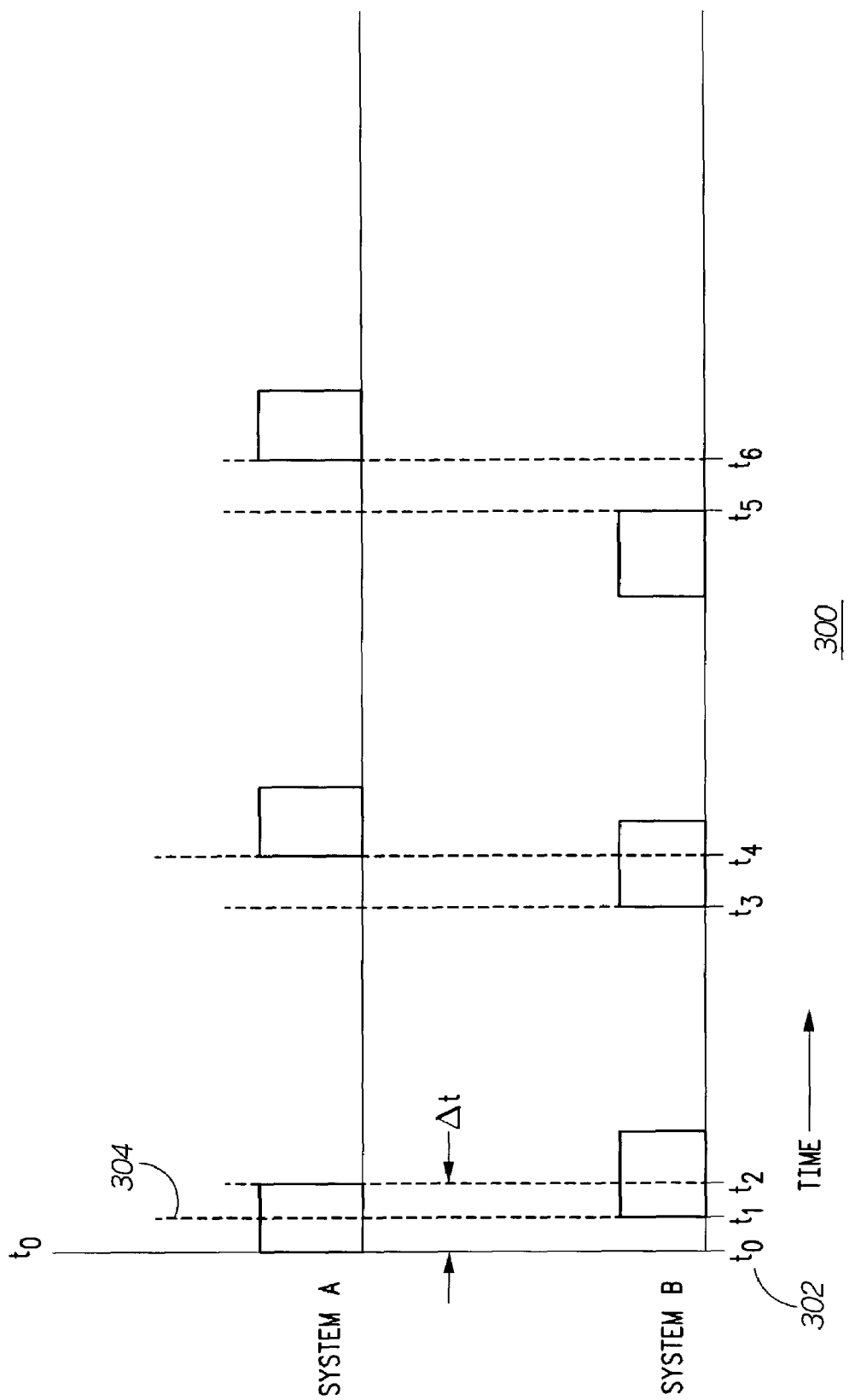
FIG. 3 shows a timing diagram of transmit events in two different mobile communication modes.

Referring now to FIG. 3, there is shown a timing diagram 300 of transmit events in two different mobile communication modes labeled system A and system B. Three different scenarios are presented here. It is not meant that these examples would occur in the order shown, or in the temporal proximity shown. Beginning at time $t_0$ 302 the multi-mode mobile communication device begins transmitting to system A in accordance with the air interface of system A, including modulation, control protocol, messaging, encoding, frequency, and so on. At time $t_1$ 304, under normal conditions, the multi-mode mobile communication device would begin transmitting to system B. However, because system A is presently engaged in transmitting, there is a conflict. The timer will resolve the conflict by first examining a delta timer, which will be explained in further detail herein in reference to FIG. 4. Generally, the delta timer is used for timing the duration $\Delta t$ of a transmit event, which lasts from $t_0$ to $t_2$. For simplicity it is preferred that a countdown timer be used, so that if the delta timer is not equal to zero, the timer recognizes that a transmit event is presently in progress. When this occurs, the timer arbitration logic must resolve the priorities of the conflicting transmit events. In the present example, system A has priority, so system B would be prohibited from transmitting. The timer would signal to the controller system B was unable to transmit and the transmit event may be rescheduled.

Since, in the present example, system A has priority, it will wrest control of the power amplifier from system B if a transmit event arises during a transmit event for system B. This is shown beginning at $t_3$, when a transmit event for system B begins. During the system B transmit event at time $t_4$ a system A transmit event arises. Since system A has priority, it will control the power amplifier. Referring back to FIG. 1 for a moment, if transmitter 112 operates system A and transmitter 114 operates system B, the controller 116 would control the transmitters so that the output of transmitter 114 is no longer provided to the power amplifier 102, and the output of transmitter 112 is thereafter provided to the power amplifier. This can be accomplished using switches, or through control signals provided to the transmitters by the controller, as is well known in the art.

Finally, in the case where the transmit events do not conflict, no action is needed. This is the case where system B generates a transmit event which ends at time $t_5$, and system A generates a transmit event that commences at time $t_6$. Since the delta timer would indicate there is no transmit event occurring at $t_6$ the timer would not need to resolve priorities.

Figure 4:
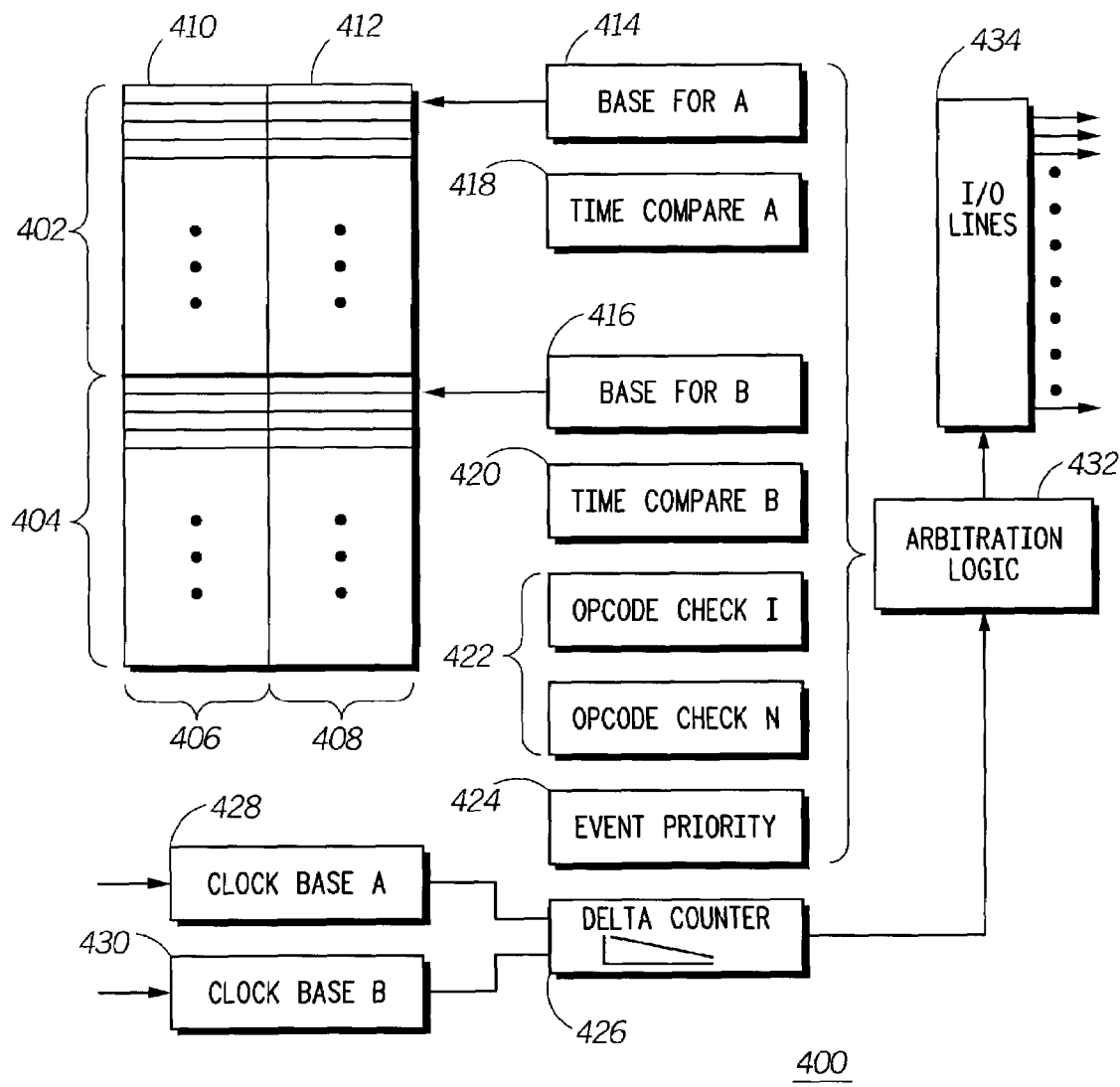
FIG. 4 shows a block schematic diagram of a timer for arbitrating transmit events in a multi-mode mobile communication device, in accordance with the invention.

Referring now to FIG. 4, there is shown a block schematic diagram of a timer 400 for arbitrating transmit events in a multi-mode mobile communication device, in accordance with the invention. The timer includes at least two register stacks 402 and 404. Each register stack comprises multiple registers for storing digital information, and has an opcode array 406 and a time code array 408. Each opcode register in the opcode array is associated with a time code register so that every opcode placed in the register stack has an associated time code indicating when to execute the opcode. That is, for example, an opcode, which is merely a digital word, is stored in an opcode register 410. A time code, also a digital word, is stored in the corresponding time code register 412. The opcode and time code are stored in the register by the controller or DSP in response to an application or operating system call. Each of the register stacks 402 and 404 are for different communication systems. That is the multi-mode mobile communication device may be in communication with two different communication systems at the same time. The first register stack 402 may be used for operation with a first communications system, and likewise for the second register stack 404 with a second communication system.

For each register stack there is a base addressing register 414, 416, and a time compare register 418, 420. The first base addressing register 414 is associated and for use with the first register stack 402, and similarly for the second base addressing register 416 with the second register stack 404. The base addressing registers hold pointers, which are digital words used to represent the beginning of the register stack in memory. Each register stack will also have a time compare register 418, 420. The time compare registers 418, 420 are used to compare the scheduled time of the next event code in the register stack with current time count. When the time of the next event matches the time of the compare register, then that event is fetched from the register stack and executed.

When a timer event occurs, the opcode of the timer event is checked by one of the opcode check registers 422. As described, each register stack has a base addressing register which points to the next register stack event that will be fetched and executed when its associated timer matches the general system counter. The opcode check registers 422 are used to compare the next event code in the register stack when looking for a particular event code such as a 'transmit' event code. This particular event code is programmed into the opcode compare register to denote a transmit event. For instance, if a transmit event in register stack 402 (e.g. for System A) is denoted by a certain value, that event value is programmed into an opcode check register. The opcode check register is then used to compare itself to the next event in the register stack. If the next event in the register stack matches the opcode check register event, a match is generated.

In the case where the opcode is a transmit event opcode, the event priority register 424 checks the priority of the system where the transmit opcode was fetched in case the delta timer is not zero. If the delta timer is not zero, and based on the priority of the system currently doing the transmit versus the system that has just requested a transmit, it will determine which system gets the new grant for transmitting. If the current system doing the transmit is of higher priority, then it continues with its transmission. Otherwise, it relinquishes its transmit to the new system which has a higher priority for transmit.

In order to resolve conflicts, the delta timer or counter 426 is used to time each transmit event. When a transmit event occurs, a digital value is used to initiate the delta timer. It is preferred that the delta timer be a count down timer so that it has a value of zero when there is no transmit event presently occurring. The delta timer is clocked based on the faster system clock of the different systems the multi-mode mobile communication device may be in communication. So, given a system A and a system B, the faster of either a system A clock base 428 or a system B clock base 430 will control the rate at which the delta timer counts. The multi-mode mobile communication device controller or DSP will place the appropriate value digital word in the delta timer so that it reaches zero when the present transmit event is finished. The arbitration logic is simply logic circuitry 432 that evaluates the various inputs and controls an input/output (I/O) multiplexer 434. The I/O mux 434 has logic signal outputs coupled to various other circuits for controlling certain events. For example, if the timer registers indicate a transmit event must presently begin, or is presently in progress, the I/O 434 is controlled such that the power amplifier is enabled by one of the I/O lines, and the DSP is also signaled to initiate transmitting, and which system to commence transmitting, either system A or system B.

Figure 5:
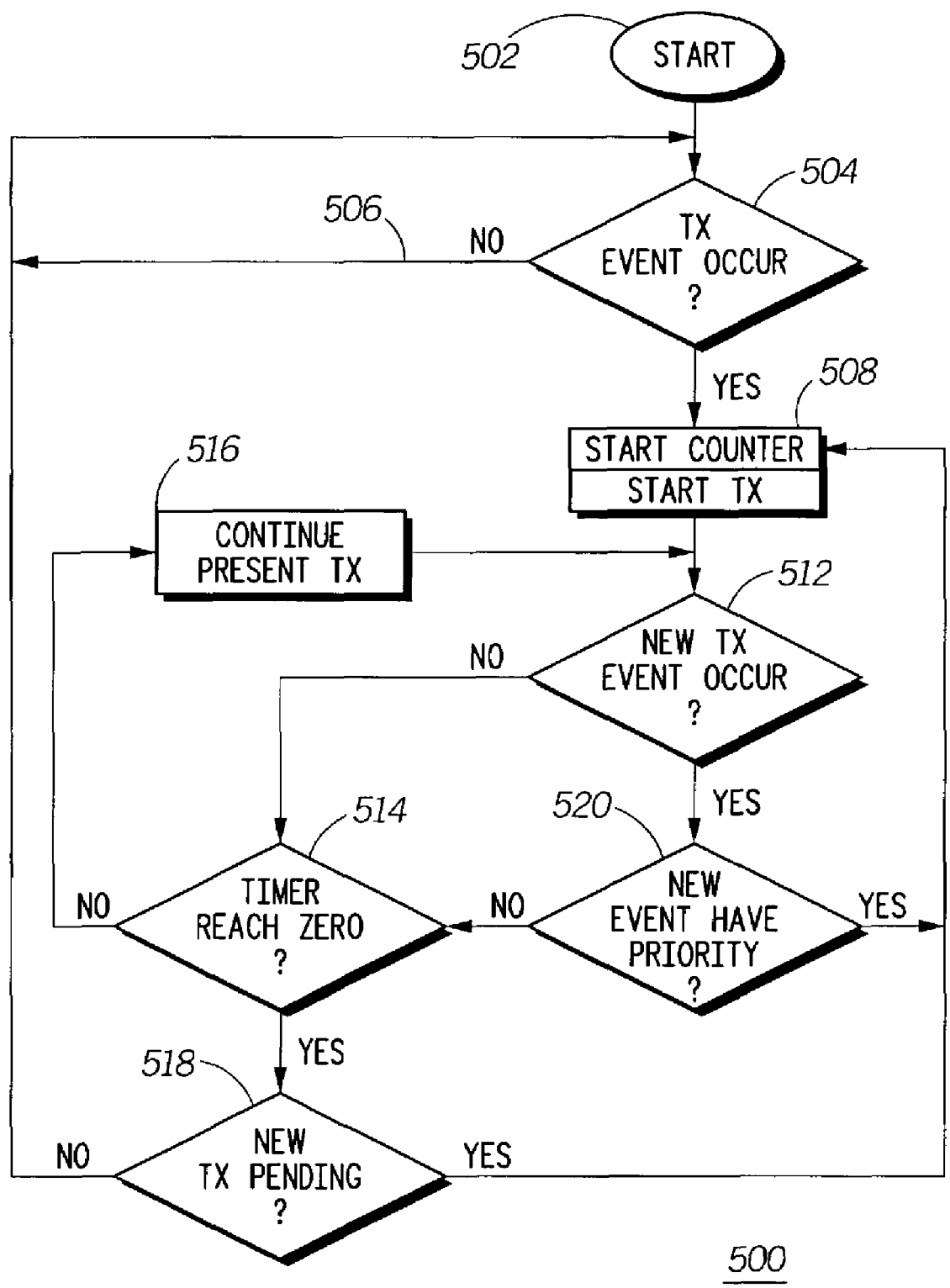
FIG. 5 shows a flow chart diagram of a method of arbitrating transmit events in a multi-mode mobile communication device, in accordance with the invention.

Referring now to FIG. 5, there is shown a flow chart diagram 500 of a method of arbitrating transmit events in a multi-mode mobile communication device, in accordance with the invention. At the start 502, the multi-m, and is not transmitting. Typically the mobile communication device will also be registered for service with two different communication systems serving the region where the mobile communication device is presently located. The timer continues to check for a transmission event 504. If no transmission event occurs 506, the timer simply keeps checking for a transmit event, such as, for example, when a transmit opcode appears as the next opcode to be executed. If a transmit event does arise, the mobile communication device begins the delta timer 508, and begins transmitting information. This event arises typically because the particular time slot to which the mobile communication device has been assigned has arrived, and it is time to transmit for the present frame. Accordingly, the mobile communication device begins transmitting 510. Then the timer logic checks for another transmit event 512. If no new transmit has arisen, the timer checks to see if the delta timer has reached zero 514. If not, then the mobile communication device will continue to transmit 516. If the delta time has reached zero, the time checks again to see if there is a new transmit event pending 518. If there is no new transmit event, the method reverts to checking for transmit events 504. If there is a new transmit event at 518, then transmission commences by resetting the delta timer 508 and commencing transmission 510. If during an initial transmit event, a new transmit event arises at 512, the timer checks the priority of system requesting transmission. If the priority is higher than the present transmit event, the delta timer is reset 508 and transmission of the new transmit event commences 510. If the new transmit event does not have priority, the timer value is checked as described before.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of performing transmit arbitration between transmit events associated with at least two modes of communication in a multi-mode mobile communication device, comprising:
   beginning a first transmit event for a first mode, the first transmit event having a duration and a priority level;
   starting a timer for the duration of the first event, the timer based on a hardware clock; and
   upon the occurrence of a transmit event for a second mode of communication, transmitting the second transmit event only if the timer is complete, or if the second transmit event has a higher priority;
   wherein the first and second modes of communication each have clock base, one of the clock bases being faster, the timer is based on the clock base of the mode with the fastest clock base.

2. A method of performing transmit arbitration as defined in claim 1, further comprising generating a notification within the multi-mode mobile communication device for use by the first and second modes.

3. A method of performing transmit arbitration as defined in claim 1, wherein there are more than a first and second mode of communication, the method further comprising establishing a priority hierarchy among the modes.

4. A timer apparatus for arbitrating transmit events in a multi-mode mobile communication device having only one transmit power amplifier, the timer apparatus comprising:
   at least two register stacks, each register stack having an opcode array and a time offset array, the opcode array comprised of a plurality of opcode registers, the time offset array comprised of a plurality of time offset registers, each opcode register corresponding to a time offset register, each opcode register for storing an opcode;
   a first base addressing register for a first register stack, and a second base addressing register for a second register stack, the base addressing registers for holding an address to point to a next event in an opcode register in it's corresponding register stack;
   a first time compare register for the first register stack, and a second time compare register for the second register stack, the first and second time compare registers for comparing an entry in the time offset arrays;
   a first opcode check register and a second opcode check register, the first and second opcode check registers for checking the opcode stored in the first and second opcode registers, the opcode check registers comparing the opcodes in the first and second opcode register for a transmit event conflict;
   a countdown timer for timing a transmit event when an opcode in either the first or second opcode check registers indicates a transmit event;
   an event priority register for indicating priority of transmit events; and
   arbitration logic for arbitrating transmit events in accordance with the event priority register.

* * * * *